US010073692B2

(12) United States Patent
Carter

(10) Patent No.: US 10,073,692 B2
(45) Date of Patent: Sep. 11, 2018

(54) SYSTEM AND METHOD OF MANAGING APPLICATION UPDATES

(71) Applicant: Google LLC, Mountain View, CA (US)

(72) Inventor: Bernadette Carter, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 46 days.

(21) Appl. No.: 15/376,624

(22) Filed: Dec. 12, 2016

(65) Prior Publication Data

US 2018/0165085 A1 Jun. 14, 2018

(51) Int. Cl.
G06F 9/44 (2018.01)
G06F 9/445 (2018.01)
G06F 8/65 (2018.01)

(52) U.S. Cl.
CPC .................... *G06F 8/65* (2013.01)

(58) Field of Classification Search
CPC ..... G06F 8/65; G06F 8/61; G06F 8/70; G06F 8/60; G06F 8/68
See application file for complete search history.

(56) References Cited

U.S. PATENT DOCUMENTS

| 6,182,086 | B1 * | 1/2001 | Lomet | G06F 11/1471 |
| 8,499,063 | B1 | 7/2013 | Satish et al. | |
| 8,655,336 | B1 * | 2/2014 | Dempski | H04L 41/5074 370/310.2 |
| 8,887,151 | B2 * | 11/2014 | Dugan | G06F 8/65 717/172 |
| 9,569,196 | B2 * | 2/2017 | Das | G06F 8/65 |
| 9,992,025 | B2 * | 6/2018 | Mahaffey | G06F 8/70 |
| 2005/0257215 | A1 * | 11/2005 | Denby | G06F 8/65 717/172 |
| 2012/0110174 | A1 * | 5/2012 | Wootton | G06F 21/564 709/224 |
| 2012/0266155 | A1 | 10/2012 | Valeriano et al. | |
| 2012/0331455 | A1 | 12/2012 | Ayachitula et al. | |
| 2013/0159985 | A1 | 6/2013 | Gilman et al. | |
| 2014/0173586 | A1 * | 6/2014 | Dugan | G06F 8/65 717/173 |
| 2015/0169877 | A1 * | 6/2015 | Mahaffey | G06F 8/70 726/22 |

(Continued)

OTHER PUBLICATIONS

International Search Report and Written Opinion from International Application No. PCT/US2017/054244, dated Dec. 27, 2017, 9 pp.

(Continued)

*Primary Examiner* — Marina Lee
(74) *Attorney, Agent, or Firm* — Shumaker & Sieffert, P.A.

(57) ABSTRACT

A method for updating an application on a computing device includes receiving, at the computing device, a notification that an update is available for the application, then responsive to the notification, obtaining, over a first time period having a predetermined length, one or more stability indicators for the application from one or more sources, the one or more stability indicators being generated after the notification is received, and automatically executing the update for the application after the expiration of the first time period when the one or more stability indicators satisfy one or more predetermined vetting rules.

24 Claims, 4 Drawing Sheets

(56) References Cited

U.S. PATENT DOCUMENTS

| | | | |
|---|---|---|---|
| 2015/0172057 A1* | 6/2015 | Mahaffey | G06F 8/70 713/176 |
| 2015/0172060 A1* | 6/2015 | Mahaffey | G06F 8/70 713/176 |
| 2015/0172146 A1* | 6/2015 | Mahaffey | G06F 8/70 709/224 |
| 2016/0179498 A1 | 6/2016 | Das et al. | |
| 2016/0259638 A1 | 9/2016 | Maghraoui et al. | |
| 2016/0321064 A1* | 11/2016 | Sankaranarasimhan | G06F 3/0484 |
| 2017/0060568 A1* | 3/2017 | Seibert, Jr. | G06F 8/65 |
| 2018/0165085 A1* | 6/2018 | Carter | G06F 8/65 |

OTHER PUBLICATIONS

Search Report and Written Opinion from counterpart Irish Application No. 2017/0207, dated Apr. 12, 2018, 4 pp.

\* cited by examiner

SYSTEM AND METHOD OF MANAGING APPLICATION UPDATES

BACKGROUND

Application platforms for developers can include services that the platform provides to users to aid the users in finding, downloading and maintaining applications on their devices. Such services can include, for example, an application store. Users can purchase and/or download applications from the application store. Furthermore, if a developer updates an application with new features or bug fixes, users can download the update at the application store.

BRIEF SUMMARY

According to an embodiment of the disclosed subject matter, a method for updating an application on a computing device, includes receiving, at the computing device, a notification that an update is available for the application, then responsive to the notification, obtaining, over a first time period having a predetermined length, one or more stability indicators for the application from one or more sources, the one or more stability indicators being generated after the notification is received, and automatically executing the update for the application after the expiration of the first time period when the one or more stability indicators satisfy one or more predetermined vetting rules.

According to an embodiment of the disclosed subject matter, means for receiving, at the computing device, a notification that an update is available for the application, then responsive to the notification, obtaining, over a first time period having a predetermined length, one or more stability indicators for the application from one or more sources, the one or more stability indicators being generated after the notification is received, and automatically executing the update for the application after the expiration of the first time period when the one or more stability indicators satisfy one or more predetermined vetting rules, are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
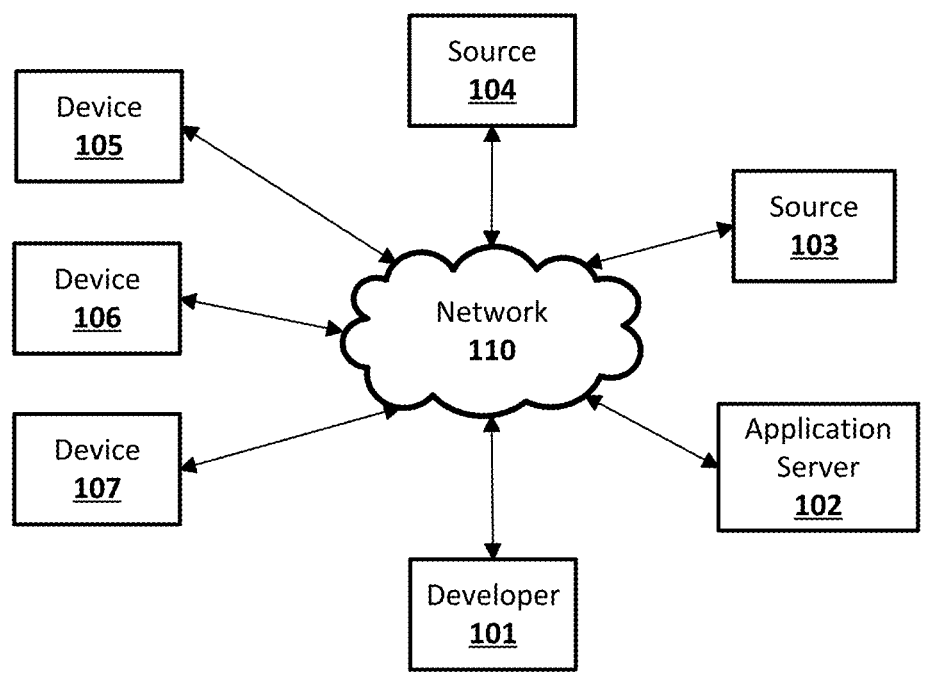
FIG. 1 shows a network configuration according to an embodiment of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Many existing distribution platforms enable users to download and install applications to electronic devices. Such platforms typically enable users to browse and download applications as well as other types of media. Developer entities and individuals that offer applications via distribution platforms typically release updates to the applications, such as in response to user feedback, feature improvements, and operating system updates. If a particular electronic device has installed a certain application and an update for the application is available, the electronic device can access the distribution platform to download the update (e.g., as software code) and locally install the update. The electronic device can also indicate to a user that certain updates are available for installation.

With the number of available applications steadily increasing, users often download applications that they may not frequently access or use. As the storage size of computing devices increase, users store larger numbers of different applications on their computing devices. For example, it is not uncommon for a user to have fifty or more applications installed on a smart phone. Such circumstances can make it difficult for the user to follow the developments of all the applications installed on their devices.

One conventional way to address the problem of keeping applications up to date is to configure the computing device to download and install updates. This can happen as an automatic background process or it can be triggered by the user. For example, a user with fifty applications on a smart phone may receive a notification from a distribution platform application which manages updates notifying the user that thirty of the fifty applications installed from that platform have updates available. The user must then either 1) go through the applications one by one and decide whether or not to update, which is tedious and time consuming, or 2) simply elect to update all the applications without reviewing the updates and hope for the best without knowing whether the updates are unauthorized, likely to damage the electronic device, unnecessary, or otherwise undesirable.

Users largely fall into one of two groups regarding which way they choose to handle updates. A first group generally prefers to stay at the forefront of development and is willing to accept the associated risks. Members of this group are more likely to be following trends and developments of applications and are likely satisfied with leaving their devices in an auto-update mode. However, a second group is generally less willing to accept the risks of auto-updating and prefers stability for their device instead of being among the first to have the latest update or application. Members of this group, for example, may have tried auto-updating in the past only to have their device lose functionality or otherwise degrade in a disappointing manner.

Neither of the conventional options (blind auto-updating or tediously going through each update one by one) addresses the problem faced by the second group. Members in this group face even potentially more severe problems since some can be passive and will not take the initiative to update applications at all, leaving their devices with obsolete defenses to known attacks and vulnerable in ways that could easily be protected if the latest stable patch was installed.

The disclosed subject matter provides a solution for users who desire to keep their applications stable and up to date but are risk averse to being counted among first installers. The disclosed embodiments enable an electronic device to auto-update an application when a new version has received a certain level of vetting that is set by and acceptable to the user. The disclosed subject matter further may provide solutions to other use cases in which a user may desire to have some control over which application updates are installed without individually vetting each update or relying on a conventional automatic update system.

According to the disclosed embodiments a user can adjust settings on an electronic device to reflect the user's level of risk aversion. The electronic device can receive a notification from an application server indicating that an update for an application installed on the electronic device is available for download via the application server. Over a predetermined period of time following the notification, the electronic device can interface with a network to retrieve, from one or more target sources, recommendations, ratings, reviews, etc., collectively referred to as "stability indicators."

A stability indicator as used herein is data that reflects a positive or negative evaluation of an application, e.g., in the form of a digital information file. Stability indicators can be retrieved from a network, such as the Internet, and can be analyzed to determine a positive or negative evaluation of an application. Stability indicators can include articles, blog posts, social media comments, crash reports, etc.

In some cases, the electronic device can limit the target sources of stability indicators to a specific group selected by the user of the electronic device or otherwise curated by another source, such as a distribution platform, a trusted third-party source, or the like.

Once retrieved, the electronic device can examine the stability indicators and automatically determine whether to download the application update based on the user's level of risk aversion.

FIG. 1 depicts an environment 100 including various components and entities configured to facilitate the functionalities as described herein. It should be appreciated that the environment 100 is merely an example and can include fewer or more components and entities, as well as other various combinations of components and entities.

As shown in FIG. 1, the environment 100 includes electronic devices 105, 106, 107 configured for use by respective users. Further, the environment 100 includes a developer entity 101, an application server 102, and source entities 103, 104. The electronic devices 105, 106, 107 can connect to and communicate with any of the developer entity 101, the application server 102, and the source entities 103, 104 via a network 110 such as, for example, a wide area network (WAN), a local area network (LAN), a personal area network (PAN), or other networks. The network 110 can facilitate any type of data communication via any wired or wireless standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). It should be appreciated that each of the developer entity 101, the application server 102, and the source entities 103, 104 can connect to and communicate with each other, for example via the network 110. Similarly, each of the electronic devices 105, 106, 107 can connect to and communicate with each other, for example via the network 110 or via peer-to-peer communication.

The developer entity 101 can be any company, group, individual, partnership, enterprise, entity, or the like that can develop and release applications and updates thereof. For example, the applications can be social networking applications, personalization applications, imaging applications, utility applications, productivity applications, news applications, games, and/or other types of applications. The application server 102 can be any combination of hardware and software that is configured to offer applications for download by electronic devices, such as the electronic devices 105, 106, 107. For example, the application server can be a distribution service that provides applications to mobile devices such as smart phones, tablets, and the like. According to embodiments, the developer entity 101 can submit or otherwise provide an application to the application server 102 for approval and/or for availing for download. Further, the developer entity 101 can submit or otherwise provide updates to applications that the application server 102 already offers for download. For example, if the application server 102 offers version 1.0 of a certain application, the developer entity 101 can provide version 1.1 of the certain application to the application server 102. Each of the electronic devices 105, 106, 107 can access the application server 102 to download and install desired applications as well as updates to the applications. In particular, one or more of the electronic devices 105, 106, 107 may download and install a certain application, such as an application of the developer entity 101. If the developer entity 101 submits an update to the application to the application server 102, one or more of the electronic devices 105, 106, 107 may download the update from the application server 102 and install the update.

In certain cases, respective users of one or more of the electronic devices 105, 106, 107 may generally desire to keep their devices secure and up to date but the user may not know whether to accept a software update, or whether to decline the update as being unauthorized, likely to cause damage, unnecessary, or otherwise undesirable, among other concerns. According to embodiments, one or more of the electronic devices 105, 106, 107 can interface with the source entities 103, 104 to retrieve stability indicators regarding updates to applications installed on the one or more of the electronic devices 105, 106, 107. Further, the one or more of the electronic devices 105, 106, 107 can examine the stability indicators to determine whether to download the application updates. The one or more electronic devices 105, 106, 107 can retrieve any selected application updates from the application server 102.

Figure 2:
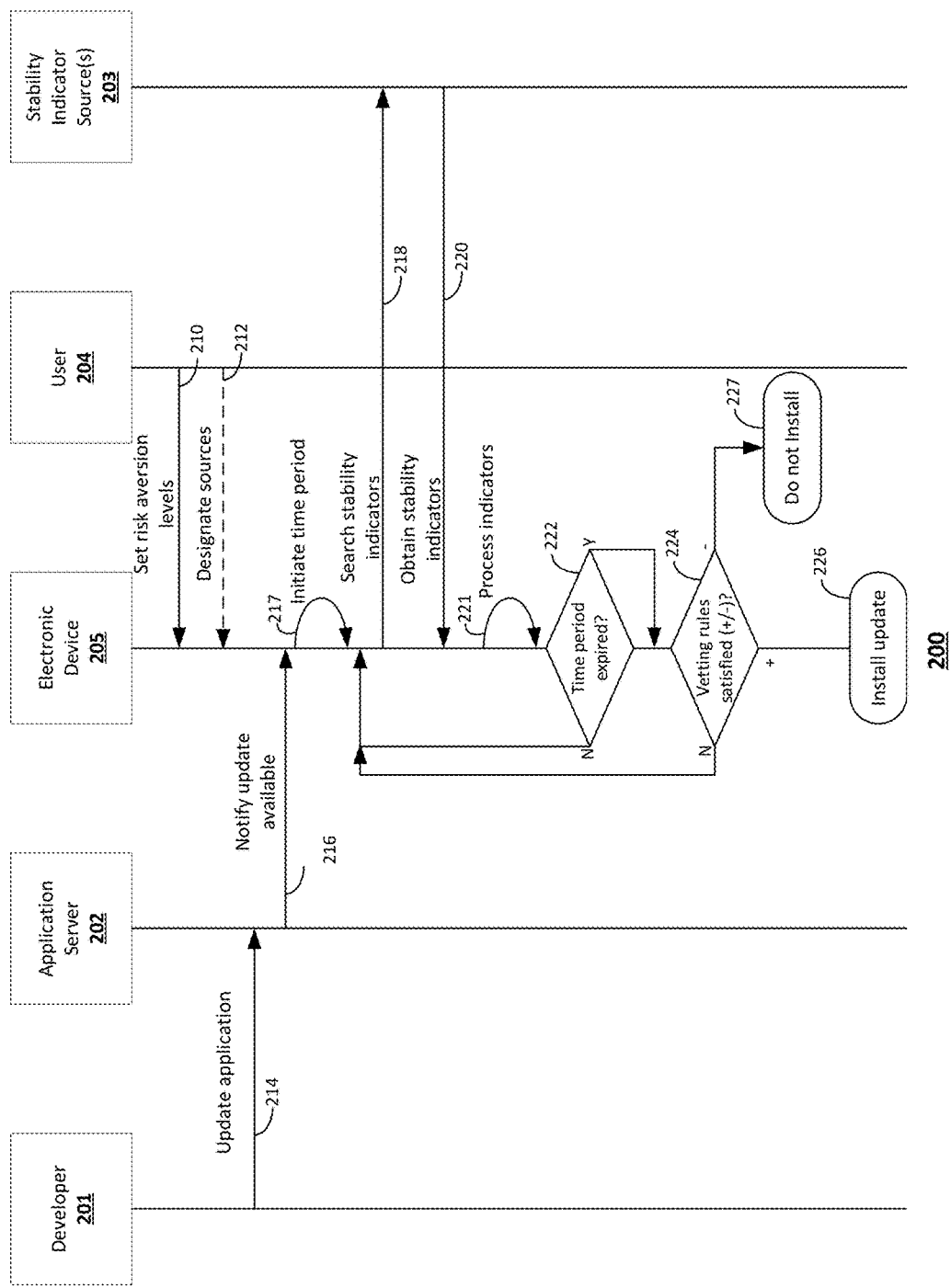
FIG. 2 shows a diagram of operations according to an embodiment of the disclosed subject matter.

A diagram 200 illustrating various embodiments is depicted in FIG. 2. As shown, the diagram 200 includes an electronic device 205 (such as the electronic device 105 as discussed with respect to FIG. 1), a developer entity 201 (such as the developer entity 101 as discussed with respect to FIG. 1), an application server 202 (such as the application server 102 as discussed with respect to FIG. 1), a stability indicator source 203 (such as the source 103 as discussed with respect to FIG. 1), and a user 204.

Although the description that follows discloses embodiments in which the electronic device 205 determines whether to install an update, in other embodiments some of the functionality of the electronic device 205 can be performed external to the electronic device 205, for example, by the application server 202.

According to embodiments, the user 204 can set (210) a risk aversion level for the electronic device. The risk aversion level can be a per-application setting or a per-application category setting. For example, a class of applications, e.g., 'games', can have a first setting while a different class, e.g., 'financial', has a second, different setting. Furthermore, the risk aversion level can be a per-device setting with each device having its own setting, or a per account setting with multiple devices having the same setting. For example, a user can have a profile that is used on multiple devices such that the same risk aversion level is set on each device. Setting the risk aversion level can be implemented in various ways, for example, as simply as the user entering a single value on a scale (e.g., 'low', 'med', 'high') or as detailed as the user adjusting multiple parameters (e.g., vetting time period, selected stability indicator sources, etc.) to fine tune how the electronic device 205 decides when to automatically install an update. The electronic device 205 can provide the user with an interface to set the risk aversion, as will be described further below.

Optionally, the user 204 can also designate (212) certain sources from which the electronic device 205 can obtain stability indicators. For example, the user may directly indicate a source from which to obtain one or more stability indicators. As another example, the user may indicate or select a provider of stability indicator sources, such as a list of stability indicator sources that is provided by an application distribution platform, trusted third party, or the like. A list of such providers may be pre-compiled and provided to the user for selection, or the user may directly indicate a source of stability indicator sources, such as by inputting a URL or other location of a list of stability indicator sources.

The developer entity 201 can provide (214) an update for an application to the application server 202, wherein the application server 202 can already avail a prior version of the application for download. In some implementations, the application server 202 can determine that the electronic device 205 has installed a prior version of the application. The application server 202 can send (216) a notification of the update to the application to the electronic device 205.

Responsive to receiving the notification, the electronic device 205 can initiate (217) a vetting time period. The vetting time period designates a predetermined minimum length of time that the electronic device 205 will wait before making a decision regarding the upgrade. The electronic device 205 or the user 204 can set the vetting time period to correspond with the user's indicated risk aversion. For example, a lower time period corresponds to a lower risk aversion while a higher vetting time period corresponds to a higher risk aversion.

After the vetting time period has been initiated, the electronic device 205 can search (218) one or more sources 203 for stability indicators that were generated or created during the vetting time period. The one or more sources 203 can include, for example, websites, online review sites, blogs, article sites, social media sites, social media networks, one or more review-capable platforms, etc. For example, the one or more sources 203 can include a store platform on the application server 202 itself, where the store can include a rating system for applications that are available for download from the store.

Optionally, to further respond to the user's risk aversion the electronic device 205 can search for stability indicators from only the one or more user-designated sources. For example, the user may trust the reviews on a particular site, ratings on a particular platform, posts/comments from a particular individual, or the like. Alternatively, the user may that find that searching from indicators without restraint results in the electronic device 205 making decisions that do not correspond with the user's expectations. Limiting the search for stability indicators to designated sources can improve the risk mitigation of the electronic device 205.

After the electronic device 205 obtains (220) the stability indicators, the electronic device 205 can process (221) the stability indicators to determine whether they are positive, negative, or neutral. The stability indicators can include, for example, articles, blog posts, ratings, star-ratings, reviews, etc. Processing numerical based indicators, such as ratings, star-ratings and the like, can include simply translating the rating to determine whether the indicator is overall positive, negative, or neutral. Processing text based indicators, such as articles, blog posts, written reviews, social media comments, and the like, can include performing a sentiment analysis on the text to determine whether the indicator is positive, negative, or neutral.

The electronic device 205 stores the results of the processing and determines (222) whether the vetting time period has expired. If the vetting time period has not yet expired, the electronic device 205 continues to search for stability indicators. If the vetting time period has expired, the electronic device 205 determines (224) whether the stability indicators show that the vetting rules have been satisfied. As alternative, the vetting period can be determined by a threshold number of stability indicators that have been obtained or processed. For example, a vetting period can extend until at least fifteen stability indicators have been obtained.

The vetting rules can be established by the user 204 or by the electronic device 205 on behalf of the user 204, as will be described further below. The vetting rules logically determined, based largely on the stability indicators, whether or not the electronic device will install the update. If the vetting rules are positively satisfied, the electronic device will install (226) the update. That is, if the stability indicators meet the positive value threshold and/or timing requirements that correspond to the user's level of risk aversion. If the vetting rules are negatively satisfied, the electronic device will not install the update. In this case, the stability indicators meet the negative value threshold and/or timing requirements that disqualify the update in accordance with the user's risk aversion level. If neither the positive nor the negative requirements have been met, then the electronic device 205 can continue to search for additional stability indicators. For example, the electronic device can execute periodic searches on a daily basis, a weekly basis, or the like. The duty cycle of the search can be a user adjustable parameter.

Although the operations of initiating a time period (217), searching for stability indicators (218), obtaining stability indicators (220), processing the stability indicators (221), and determining when to update, not update or continue searching (222, 224, 226, 227), are described as being executed by the electronic device 205, in some embodiments the application server 202 can execute this operation and transmit the result to the electronic device 205. Alternatively, these operations can be outsourced to an external third party. Furthermore, in some embodiments the application server 202 can include a user interface that recommends directly whether an update should be installed based on a user's stability settings. The application server 202 can provide an additional check service that notifies the user when the user elects to manually install an update that has not met the users stability setting criteria, or can prevent displaying a notification of an update to a user until the application server 202 has completed a vetting processes as disclosed herein.

The vetting rules can include one or more logical algorithms, conditions or requirements that can be based on, among other factors, the stability indicators, the vetting time period, and other pre-determined time periods. The vetting rules can include only a single rule or may include multiple rules, depending on the user's risk aversion level. As described above, vetting rules can be positive, that is, a rule to determine when to install an update, or negative, that is, a rule to determine when an update is disqualified from being installed and no further action regarding the update is required. Several illustrative examples of vetting rules according to the disclosed embodiments will be provided, however, one of ordinary skill in the art will understand that the disclosed subject matter is not limited to the disclosed examples.

An example positive vetting rule that can be associated with a high level of risk aversion can be implemented with the follow requirements:
  vetting time period=10 days;
  designated indicator source=Application Store;
  indicator threshold average=4 stars;

Rule 1

The electronic device initiates the vetting time period for an application upon receiving a notification of an available update for the application. During the vetting time period, the electronic device obtains, from only the Application Store, ratings associated with the application. When the ten-day vetting time period has expired, if the minimum average of the obtained ratings is at least the indicator threshold amount of '4 stars', then the requirements have been met and the electronic device automatically installs the update. If, on the other hand, the minimum average of the obtained ratings is less than the threshold amount of '4 stars', then the electronic device will not install the update.

In this case, since the vetting rule is a positive rule the electronic device can continue to check for stability indicators on a duty cycle after the expiration of the vetting time period. Nothing in this rule disqualifies the update from being installed, for example if the minimum average of the obtained ratings rises above the threshold '4 stars' on the fifteenth day following receipt of the notification.

Furthermore, since the indicator source is limited to a specific platform, i.e., the Application Store, a threshold can be set that is specific to that platform.

An example negative vetting rule associated with a high level of risk aversion can be implemented as follows:
  vetting time period=5 days;
  indicator threshold average='negative';

Rule 2

In this case, there is no restriction on the stability indicator source. The broader indicator threshold of 'negative' is used here to apply to indicators obtained from potentially multiple different sources. For example, the sources may include a blog post that is a review of the latest version of the application, posted during the vetting time period. A sentiment analysis applied to the post may indicate that it is a negative review, causing the electronic device to interpret the post as a negative indicator. The sources may further include two dozen ratings obtained from the Application Store. The ratings may average to 2.5 stars, that is, the net effect of the ratings will be to contribute to the negative indicator average. The sources may further include an article review published during the vetting time period. A sentiment analysis applied to the article may indicate that the article is a positive review. However, the average indicator over the vetting time period is negative. In this case, the electronic device will determine that the update has been disqualified from being installed and take no further action regarding the update.

Vetting rules can be created with custom or specific factors, and the indicator threshold can be a value other than an average, for example, a cumulative amount, a single occurrence, or absence of an occurrence. An example negative vetting rule that is demonstrative of a cumulative threshold can be implemented with the following requirements:
  vetting time period=1 day;
  designated indicator source=Developer Site Forum [URL];
  stability indicator phrase='crash';
  indicator threshold=100;

Rule 3

In this case, the electronic device is instructed to search the developer's site for instances of the term "crash" for one day. If, during that one day, a threshold number of 100 instances is detected, the electronic device determines that the negative vetting rule requirements are met and the update is disqualified from being downloaded.

An example positive vetting rule that is demonstrative of a single occurrence can be implemented with the following requirements:
  vetting time period=7 days;
  designated indicator source=Trusted Site [URL1], Trusted Site [URL2];
  indicator threshold=1 positive;

Rule 4

In this case, the electronic device will check two trusted sites for seven days. If, during that time, either of the trusted sites posts a single positive review, the vetting rule requirement will be met and the electronic device will install the update.

Furthermore, vetting rules may include a secondary time period as a requirement in addition to the vetting time. An example of a positive vetting rule demonstrative of absence of an occurrence and a secondary time period can be implemented with the following requirements:
  vetting time period=5 days;
  designated indicator source=Application Store;
  indicator absence='<4 stars';
  absence time period=2 days;

Rule 5

In this case the electronic device will monitor the ratings posted on the Application Store. If, at some point in time, two days pass during which the application does not receive any rating less than '4 stars', then after the vetting time period the electronic device will install the update.

The above provided examples are only specific implementations intended to demonstrate the flexibility of the disclosed embodiments. One of ordinary skill in the art can envision additional vetting rules that fall within the scope of the disclosure. For example, in addition to the above, vetting rules can include percentage based thresholds, for example, require that greater than N percentage of raters have given a rating of X or greater to the update, require that greater than N percentage of stability indicator sources have left positive indicators regarding the update, require that no more than N occurrences of a stability indicator occur over a predetermined span of time, etc.

Vetting rules may further factor in customized data formats based on third party protocols. For example, a platform may provide a communication protocol to exchange data with the electronic device, such as crash reports, usage data, popularity level, or specialized social media comments. The exchanged data can function, for example, as a stability indicator in a vetting rule.

Vetting rules for an electronic device can be stacked. That is, an electronic device can include both negative and positive rules to account for multiple scenarios according to the user's level of risk aversion.

Figure 3A:
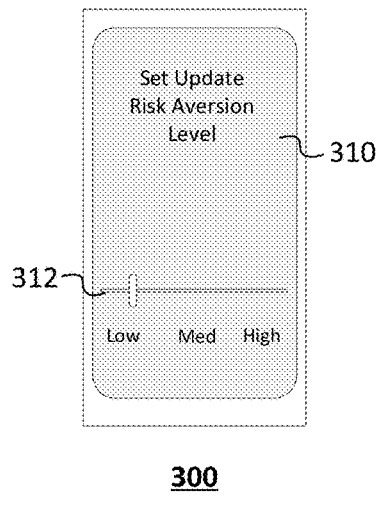
FIG. 3A shows a computing device interface according to an embodiment of the disclosed subject matter.
Figure 3B:
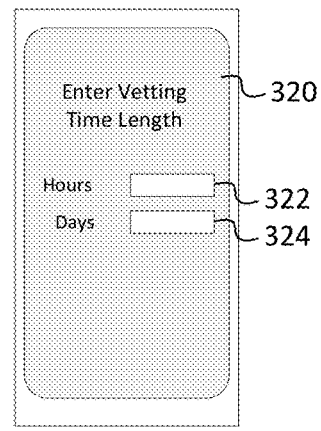
FIG. 3B shows another computing device interface according to an embodiment of the disclosed subject matter.
Figure 3C:
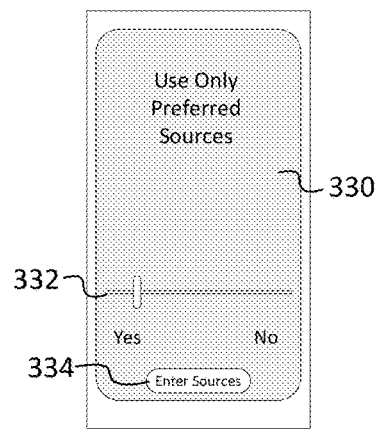
FIG. 3C shows another computing device interface according to an embodiment of the disclosed subject matter.

FIGS. 3A, 3B, and 3C illustrate example interfaces associated with the execution, facilitation, and implementation of the vetting rules associated with the embodiments discussed herein. According to embodiments, an electronic device (such as any of the electronic devices 105, 106, 107 of FIG. 1, e.g., a smart phone, tablet, laptop, gaming device, etc.) can display the example interfaces as a functionality of an operating system or of a dedicated application of the electronic device. The data associated with the example interfaces can be transmitted to, received from, and/or synchronized with one or more servers or entities, such as the developer entity 101, the application server 102, and the sources 103, 104 (FIG. 1). It should be appreciated that the interfaces of FIGS. 3A, 3B and 3C are merely selected examples and can include other various details, arrangements, and/or selectable options. One of ordinary skill in the art can envision other interfaces that fall within the scope of the disclosure.

FIG. 3A shows an electronic device 300 with an example interface 310 associated with the embodiments as described herein. Interface 300 may be used to operate the electronic device in a mode that does not require the user to input specific details for all of the risk aversion settings. This may be referred to as a 'minimal mode'. In the minimal mode, the electronic device automatically determines various parameter settings based in part on the user's selection.

The interface 310 includes a selection slider 312 that a user may adjust to select a risk aversion setting. In this case, the electronic device can be pre-configured to adjust parameters, such as the vetting time period, designated sources, and vetting rules, based upon the user-selected setting. For example, a setting of 'low' risk aversion can result in the electronic device 300 implementing Rule 3 described above while a setting of 'high' results in the electronic device 300 implementing Rule 2.

In minimal mode, the electronic device can attempt to retrieve application specific data to factor in to the parameter determinations. For example, the vetting time period can be determined based in part on a popularity level of the application. A default time period can be set based on the user's risk aversion level. The default time period can be decreased for an application that has achieved a popularity level above a threshold amount, for example, as an application that has received more than a thousand ratings in a platform store. Conversely, the default time period can be increased for an application that has not reached a threshold popularity level. Comparatively, there is a greater likelihood that enough indicators to make a determination can be obtained in a shorter amount of time for the more popular application than the less popular application.

While interface 310 shows a relatively simple, user-friendly interface for the minimal mode, some users will prefer to exercise more direct and precise controls to manage their risk aversion. FIG. 3B shows electronic device 300 with a different interface (320) associated with the embodiments described herein. Interface 320 includes entry fields 322, 324 wherein a user can enter the exact length of time that the user prefers for the vetting time period to last. In this manner a user with high risk aversion can set a relatively longer vetting time period and a user with low risk aversion can set a relatively shorter vetting time period.

FIG. 3C shows electronic device 300 implementing another interface (330) associated with the embodiments described herein. Interface 330 includes a slider 332 that a user can use to select whether the electronic device 300 can use any default available stability indicator sources or is limited to one or more user-preferred sources. If the user prefers to only use one or more selected sources, the user can select 'Yes' and press button 34 to enter the information regarding the source, e.g., URL, name, etc.

Interfaces similar to those shown in FIGS. 3A-3C can be implemented to give the user the ability to input, delete, or edit the parameters and rules as described above. Furthermore, interfaces can be provided through devices other than the electronic device 300. For example, referring to FIG. 1, the application server 102 can host a user account that stores the user's risk aversion settings. The application server 102 can provide an interface accessible through the network 110 that allows the user to edit the user's settings, for example, via a website or a program.

By managing the user's risk aversion according to the disclosed embodiments, functionality of the computing device can be greatly improved. There are many users who do not update their devices and are forced to suffer the consequences of their devices being vulnerable, insecure, and in some cases malfunctioning. On the other hand, there are many users who, unaware of the risks of being among first adopters, blindly auto-install every update and unexpectedly suffer the consequences inherent in many newly released updates. For example, a developer may push out an update that creates an excessive number of background jobs that drain battery life and causes the computing device to overheat, or an update that uses too much memory and slows down the computing device, or an update that includes bloatware that takes up too much storage space. Often times the only remedy available for these maladies is to completely uninstall the application and wait for a next update, which may or may not be in development. The disclosed embodiments present solutions for both the passive user and the unaware user by preventing undesirable updates from being installed and ensuring that good updates are automatically installed.

In situations in which the systems discussed here collect personal information about users, or may make use of personal information, the users may be provided with an opportunity to control whether programs or features collect user information (e.g., information about a user's social network, a social network vetting an application, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 4:
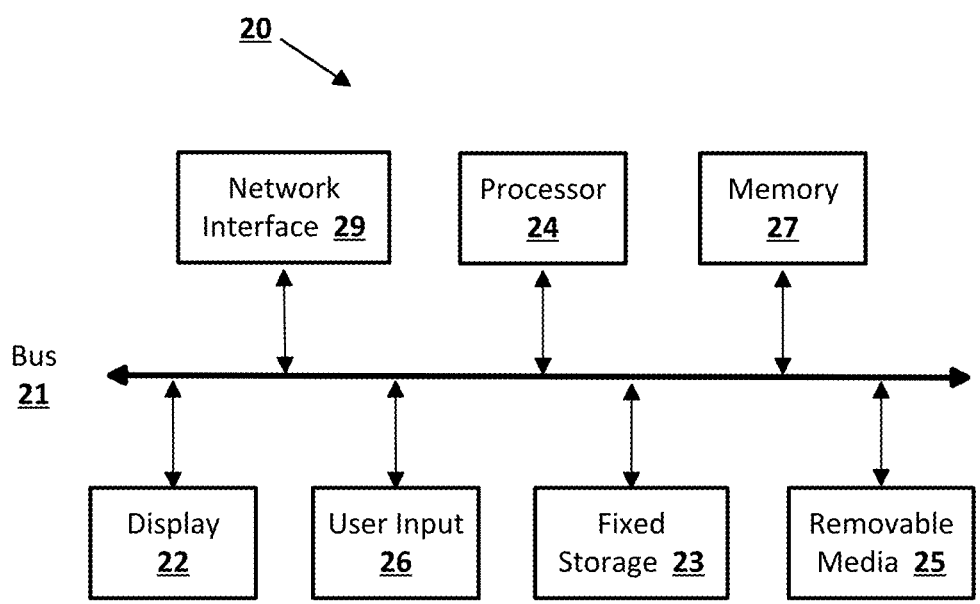
FIG. 4 shows a computing device according to an embodiment of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for updating an application on a computing device, comprising:
   determining, by the computing device, a predetermined length of time for obtaining stability information used to vet application updates before executing the application updates;
   receiving, at the computing device, a notification that an update is available for the application;

responsive to the notification, obtaining, during the predetermined length of time since the notification is received, one or more stability indicators for the update from one or more sources, the one or more stability indicators having been generated by the one or more sources during the predetermined length of time since the notification is received; and after the predetermined length of time has elapsed, automatically executing the update when the one or more stability indicators satisfy one or more predetermined vetting rules.

2. The method of claim 1, wherein the one or more stability indicators comprises crash reports associated with the application.

3. The method of claim 2, wherein the one or more predetermined vetting rules comprises a rule specifying that no more than a threshold amount of crash reports are generated over the predetermined length of time.

4. The method of claim 1, wherein obtaining the one or more stability indicators comprises obtaining one or more ratings associated with the application from a platform that provides the application for download, the one or more ratings being submitted during the predetermined length of time since the notification is received.

5. The method of claim 4, wherein the one or more predetermined vetting rules comprises a rule specifying that greater than a threshold number of the one or more ratings are above a predetermined level.

6. The method of claim 4, wherein the one or more predetermined vetting rules comprises a rule specifying that none of the one or more ratings have a value below a predetermined threshold value.

7. The method of claim 1, wherein obtaining the one or more stability indicators comprises:
obtaining one or more reviews associated with the application from the one or more sources; and
performing a sentiment analysis on the one or more reviews to determine polarity of the one or more reviews.

8. The method of claim 7, wherein the one or more predetermined vetting rules comprises a rule specifying that greater than a threshold amount of the one or more reviews is positive polarity.

9. The method of claim 7, wherein the one or more predetermined vetting rules comprises a rule specifying that fewer than a predetermined amount of the one or more reviews is negative.

10. The method of claim 1, wherein the predetermined length of time is set by a user of the computing device.

11. The method of claim 1, wherein the predetermined length of time is set automatically by the computing device based on a popularity level of the application.

12. The method of claim 1, wherein the one or more sources are limited to a group of members that is selected by a user of the application.

13. The method of claim 1, wherein the predetermined length of time is determined before the notification is received.

14. A computing device, comprising:
a memory storing an application and coded instructions;
a network communication component; and
a processor configured to execute the code instructions stored on the memory, the execution causing the computing device to:
determine a predetermined length of time for obtaining stability information used to vet application updates before executing the application updates;
receive, via the network communication component, a notification that an update is available for the application;
obtain, during the predetermined length of time since the notification is received, one or more stability indicators for the application from one or more sources, the one or more stability indicators having been generated by the one or more sources during the predetermined length of time since the notification is received; and
after the predetermined length of time elapses, automatically execute the update when the one or more stability indicators satisfy one or more predetermined vetting rules.

15. The computing device of claim 14, wherein the one or more stability indicators comprises crash reports associated with the application.

16. The computing device of claim 15, wherein the one or more predetermined vetting rules comprises a rule specifying that no more than a threshold amount of crash reports are generated over the predetermined length of time.

17. The computing device of claim 14, wherein obtaining the one or more stability indicators comprises obtaining one or more ratings associated with the application from a platform that provides the application for download, the one or more ratings being submitted during the predetermined length of time since the notification is received.

18. The computing device of claim 17, wherein the one or more predetermined vetting rules comprises a rule specifying that greater than a threshold number of the one or more ratings are above a predetermined level.

19. The computing device of claim 17, wherein the one or more predetermined vetting rules comprises a rule specifying that none of the one or more ratings have a value below a predetermined threshold value.

20. The computing device of claim 14, wherein obtaining the one or more stability indicators comprises:
obtaining one or more reviews associated with the application from the one or more sources; and
performing a sentiment analysis on the one or more reviews to determine polarity of the one or more reviews.

21. The computing device of claim 20, wherein the one or more predetermined vetting rules comprises a rule specifying that greater than a threshold amount of the one or more reviews is positive polarity.

22. The computing device of claim 20, wherein the one or more predetermined vetting rules comprises a rule specifying that fewer than a predetermined amount of the one or more reviews is negative.

23. The computing device of claim 14, wherein the predetermined length of the time is set by a user of the computing device or is set automatically by the computing device based on a popularity level of the application.

24. A non-transitory computer-readable storage medium comprising instructions that, when executed, cause at least one processor of a computing device to:
determine a predetermined length of time for obtaining stability information used to vet application updates before executing the application updates;
receive a notification that an update is available for an application executing at the at least one processor;
obtain, during the predetermined length of time since the notification is received, one or more stability indicators for the application from one or more sources, the one or more stability indicators having been generated by the one or more sources during the predetermined length of time since the notification is received; and after the predetermined length of time since the notification is received elapses, automatically execute the update when the one or more stability indicators satisfy one or more predetermined vetting rules.

\* \* \* \* \*